United States Patent
Daniell

(10) Patent No.: US 11,641,851 B2
(45) Date of Patent: May 9, 2023

(54) 3-D FEATURE PROTECTOR

(71) Applicant: Louis D Daniell, Arlington, TN (US)

(72) Inventor: Louis D Daniell, Arlington, TN (US)

( * ) Notice: Subject to any disclaimer, the term of this patent is extended or adjusted under 35 U.S.C. 154(b) by 398 days.

(21) Appl. No.: 16/686,116

(22) Filed: Nov. 16, 2019

(65) Prior Publication Data

US 2021/0144984 A1 May 20, 2021

(51) Int. Cl.
| | | |
|---|---|---|
| *A01K 97/00* | (2006.01) | |
| *A01K 97/06* | (2006.01) | |
| *F16B 2/22* | (2006.01) | |
| *F16B 1/00* | (2006.01) | |

(52) U.S. Cl.
CPC .............. *A01K 97/06* (2013.01); *F16B 1/00* (2013.01); *F16B 2/22* (2013.01); *F16B 2001/0035* (2013.01)

(58) Field of Classification Search
CPC ............ A01K 97/06; B65D 25/10–108; B65D 71/403; B65D 71/70
See application file for complete search history.

(56) References Cited

U.S. PATENT DOCUMENTS

| | | | | |
|---|---|---|---|---|
| 2,540,340 A * | 2/1951 | Linblade | ................ | A01K 97/06 224/183 |
| 3,948,579 A * | 4/1976 | Schirmer | ............... | A01K 97/06 220/520 |
| 4,020,584 A * | 5/1977 | Michal | .................... | A01K 97/06 43/57.1 |
| 4,653,220 A * | 3/1987 | Olsen, Sr. | ............. | A01K 97/06 43/57.1 |
| 4,770,327 A * | 9/1988 | Fortson | .................. | A01K 97/06 224/406 |
| 4,826,059 A * | 5/1989 | Bosch | ..................... | A45C 11/24 211/DIG. 1 |
| 5,526,927 A * | 6/1996 | McLemore | ............ | A01K 97/06 206/315.11 |
| 9,247,723 B1 * | 2/2016 | Fisser | ..................... | A01K 97/06 |
| 9,526,309 B2 * | 12/2016 | Huyke-Phillips | ...... | A45C 11/16 |
| 10,602,818 B1 * | 3/2020 | Kerr | ....................... | B65D 25/10 |
| 2006/0162234 A1 * | 7/2006 | Gagnet | .................. | A01K 97/06 43/57.1 |
| 2011/0005121 A1 * | 1/2011 | Gelber | ................... | A01K 97/06 43/57.1 |
| 2014/0033602 A1 * | 2/2014 | Gesik | ..................... | A01K 97/06 43/57.1 |
| 2015/0096221 A1 * | 4/2015 | Marek | .................... | A01K 97/06 43/54.1 |
| 2017/0265448 A1 * | 9/2017 | Duffy | ..................... | A01K 97/06 |
| 2018/0007881 A1 * | 1/2018 | Downey | ................ | A01K 97/06 |
| 2018/0007882 A1 * | 1/2018 | Langley | ................ | A01K 97/06 |
| 2021/0084877 A1 * | 3/2021 | Ogarrio | ................. | A01K 97/06 |

* cited by examiner

*Primary Examiner* — Richard T Price, Jr.
(74) *Attorney, Agent, or Firm* — David J. Kreher

(57) ABSTRACT

An apparatus comprising a base and a plurality of risers. The apparatus used to hold, secure, or store fishing hooks with hackle so that the hackle is not damaged by being compressed against an adjacent surface. The plurality of risers are magnetic in order that each riser can attract hooks so that each hook can extend out from the riser, thus protecting the hackle from adjacent surfaces, and each riser can be attached to the surface such that the riser extends out from the surface.

5 Claims, 8 Drawing Sheets

3-D FEATURE PROTECTOR

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

Hackle is three-dimensional features possibly appearing as long, narrow or wide feathers, hairs, or other materials that are attached to a fishing hook to make the hook more attractive to the fish, increasing the likelihood that the fish will bite the hook and thus be caught. Other three-dimensional features are used in fishing for a similar purpose, but may not be attached to a hook. For the present purposes hackle is three-dimensional features possibly appearing as long, narrow or wide feathers, hairs, or other materials attached to a hook or other metal object shall be known as hackle. Further, the hook or other metal object shall be called a hook. The present disclosure presents a method of holding, securing, or storing a hook with hackle while minimizing or eliminating damage to the hackle's three-dimensional nature.

Background of the Invention

Hackle and other three-dimensional features that appear as long, narrow or wide feathers, hairs, or other materials that extend out in multiple directions from a hook are used in fishing to attract fish. Because of the fine nature of the hackle, the feathers, hairs, or other materials are susceptible to bending or being compressed. This bending or breaking diminishes the attractive nature of the hackle and once damaged, the hook with hackle is less suitable for fishing. Frequently, this damage occurs while the hook and hackle is held, secured. The hook with hackle is usually held, secured, or stored on a surface or in a container where the hook can bounce around and damage the hackle or, because of the magnetic nature of the hook or other feature to which the hackle is attached, for example, the hook with hackle is attached to a magnetic plate, thus compressing the hairs of the hackle that would otherwise protrude in the direction of the magnetic plate. The present disclosure reveals an apparatus for the holding, securing, or storing of hooks with hackle as well as a method of use.

SUMMARY OF THE INVENTION

The present disclosure reveals an apparatus for the holding, securing, or storing of hooks with hackle comprising a riser with a magnet on both ends, and/or on the sides, and a surface to attach the riser and from which the riser extends out. The eye of a hook or hook bend can then be attached to a magnetized portion (at an end or sides) of the riser, which allows the hook to extend out from the riser preventing the hook with hackle from being compressed against an adjacent surface. The riser can be of any shape or material and may be secured to a surface at any angle and in any manner that facilitates separation of the hook with hackle from the adjacent surface.

In a first embodiment, one end of the riser comprises a magnet while the opposing end of the riser is not magnetized. In this embodiment, the end of the riser that is not magnetized may be or any shape, threaded, or comprise a socket. Further, the surface may comprise a plurality of holes, wherein each hole of the plurality of holes is the same shape as a non-magnetized end of the riser, so that the riser may be inserted into any hole of the plurality of holes, or the surface may comprise a plurality of perforations so that the threaded end of the riser can fit into any perforation of a plurality of perforations on the surface, or the surface may be smooth to allow adhesive to affix the riser to the surface, or the surface may comprise a plurality of studs onto which a socket is attached, or the surface may comprise a plurality of clips into which a riser can be attached, or the riser may be an integral part of the surface.

In a second embodiment, both ends of the riser are magnetized. In this embodiment, the surface is attractive to a magnet such that, when one end of the riser is placed in contact with the surface, the magnet of the riser is attracted to the surface, and the magnetic attraction adheres the riser to the surface.

In a version of the second embodiment, the entire riser is magnetized. In this embodiment, the surface is attractive to a magnet such that, when one part (ends or sides) of the riser is placed in contact with a surface, that magnetic part of the riser is attracted to the surface, and the magnetic attraction adheres the riser to the surface.

In any of the embodiments, a surface may further comprise sides that surround the perimeter of the surface and the sides may comprise a plurality of holes from which the riser can extend or can be attractive to a magnet so that a magnetic end or magnetic ends of a riser can be attached to the sides. There may further be a top to cover the sides and thus enclose the surface. Said top may comprise a plurality of holes from which the riser can extend or can be attractive to a magnet so that a magnetic end or magnetic sides of a riser can be attached to the top. There may also be a shape comprising an exterior, wherein the exterior comprises a plurality of surfaces, and wherein those surfaces comprise the characteristics detailed in any of the above described embodiments.

AMENDED DETAILED DESCRIPTION OF THE INVENTION

Figure 1:
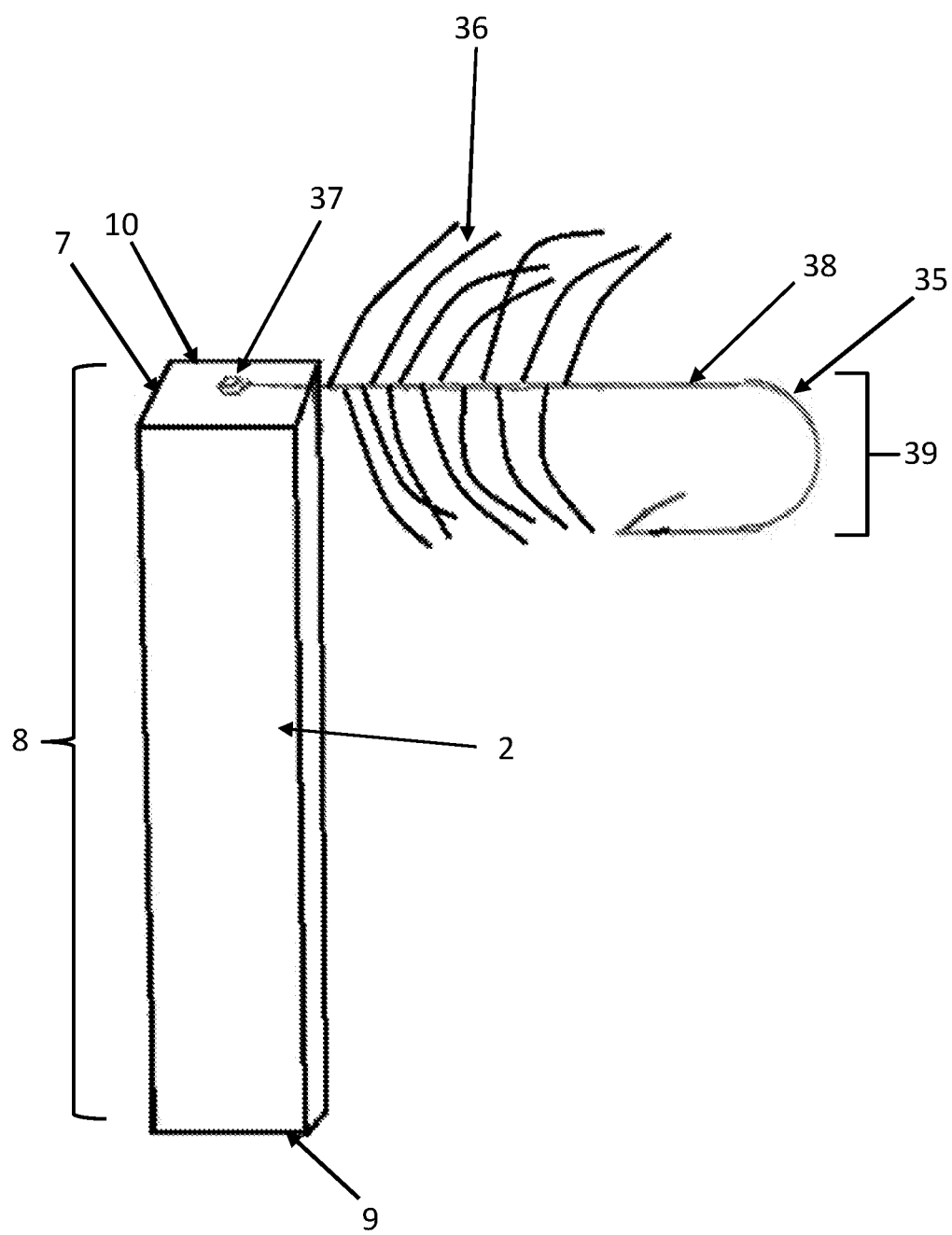
FIG. 1 is an image of a riser with hook attached to the riser and hackle extending from the hook.
Figure 2A:
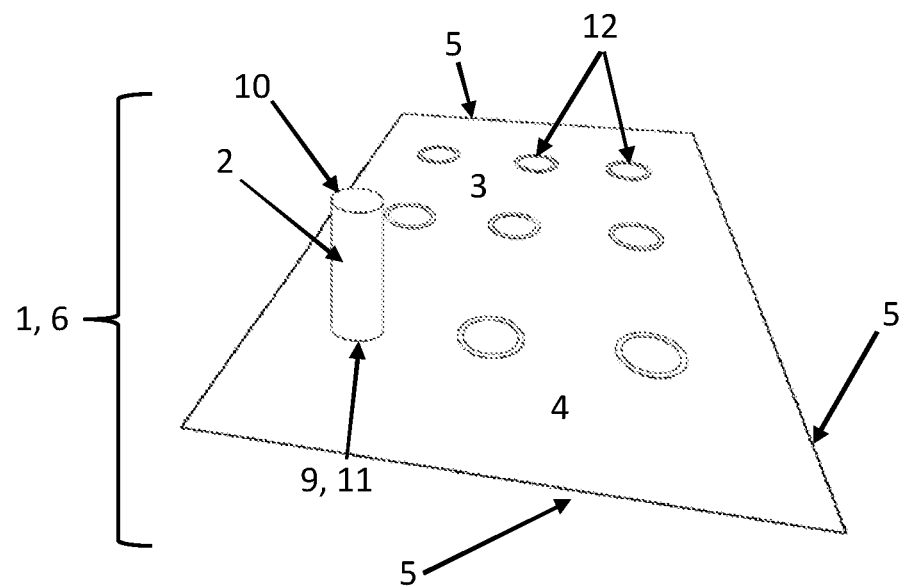
FIG. 2A is an image of the first embodiment of the apparatus indicating a riser and surface with a plurality of holes.
Figure 2B:
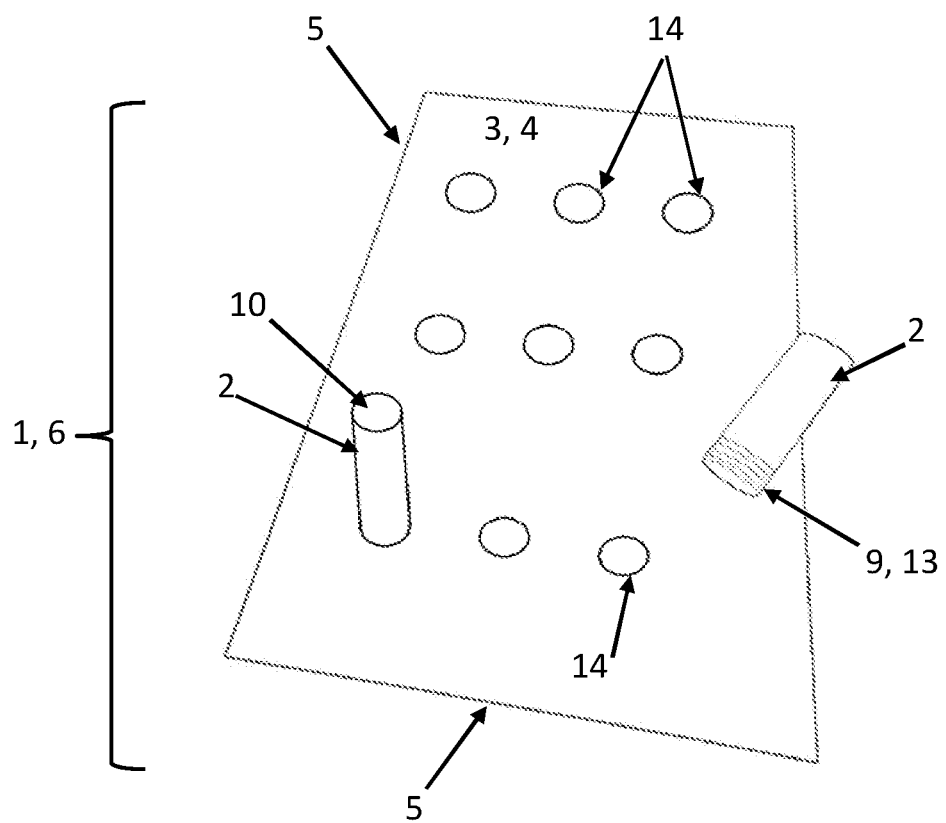
FIG. 2B is an image of the first embodiment of the apparatus indicating a riser with a threaded end and surface with a plurality of perforations.
Figure 2C:
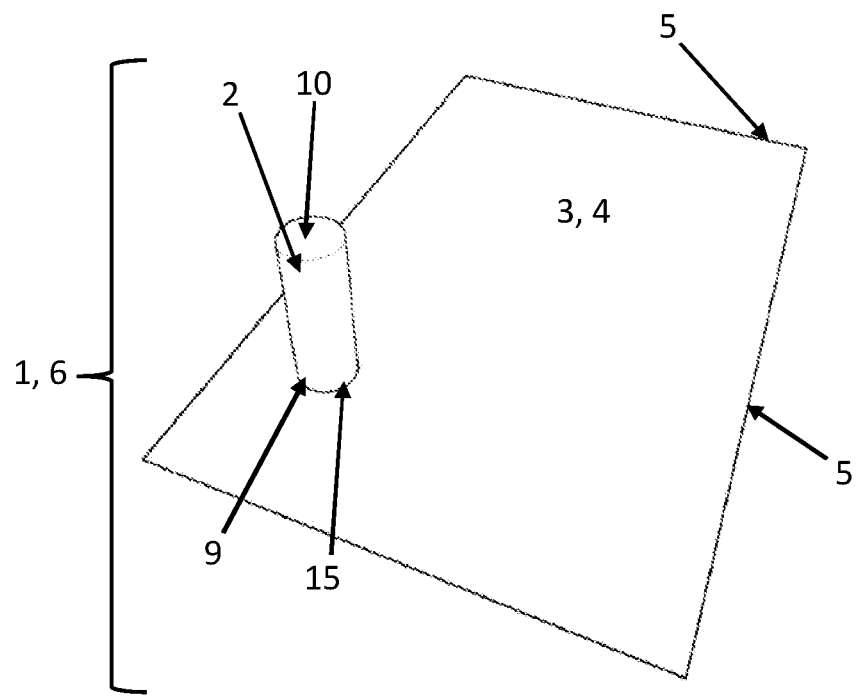
FIG. 2C is an image of the first embodiment of the apparatus indicating a riser and surface with adhesive to affix the riser to the surface.
Figure 2D:
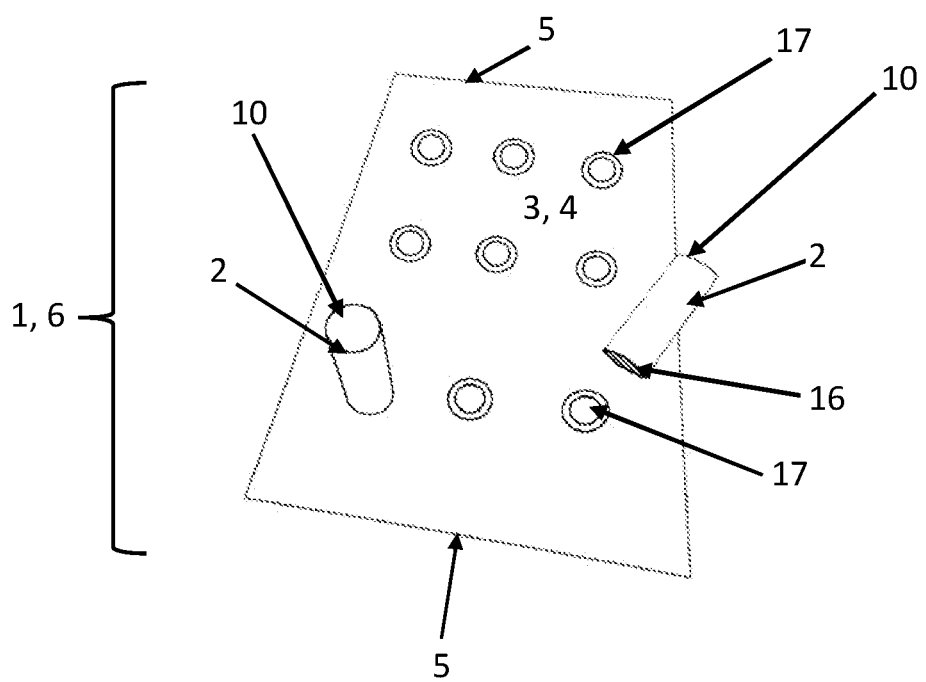
FIG. 2D is an image of the first embodiment of the apparatus indicating a socket to affix the riser to a stud of a plurality of studs on the surface.
Figure 2E:
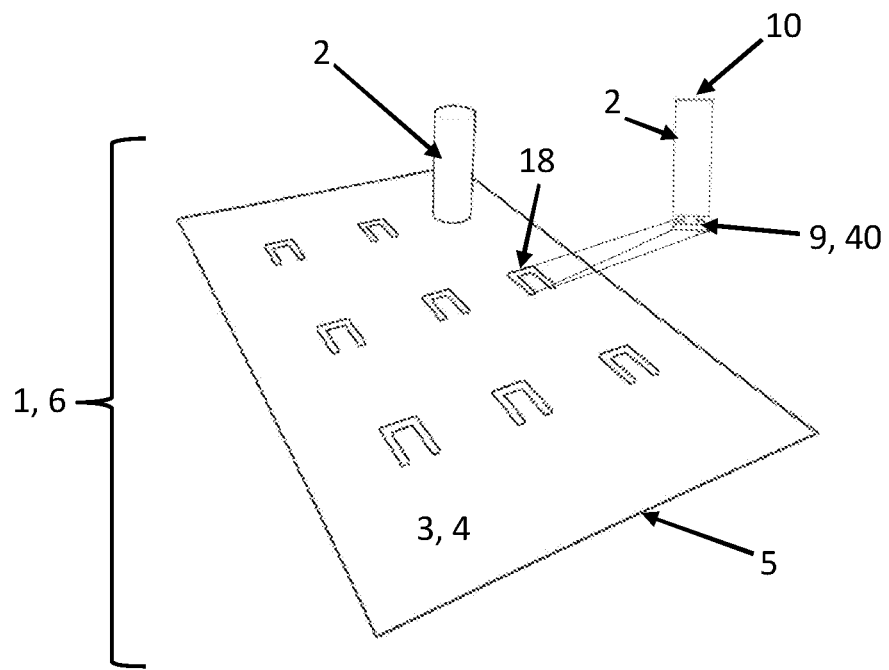
FIG. 2E is an image of the first embodiment of the apparatus indicating a riser with a shape of an end such that the end would affix the riser to a clip of a plurality of clips on the surface.
Figure 2F:
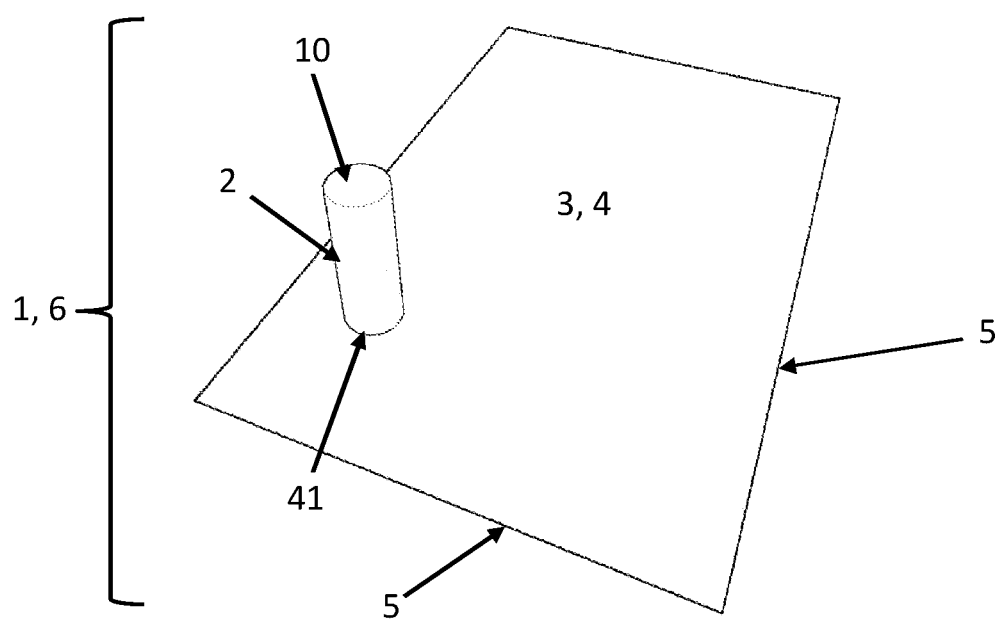
FIG. 2F is an image of the first embodiment of the apparatus indicating the riser is an integral part of the surface.
Figure 3:
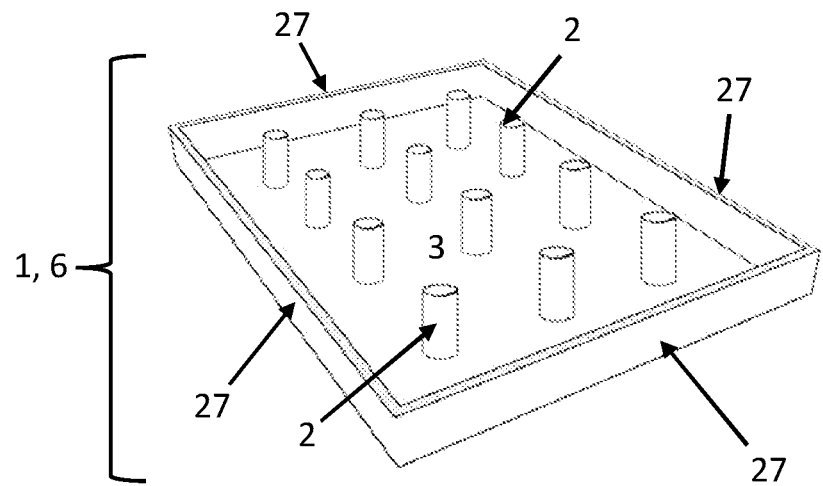
FIG. 3 is an image of the first embodiment of the apparatus indicating a riser, surface, and plurality of sides enclosing the apparatus.
Figure 4:
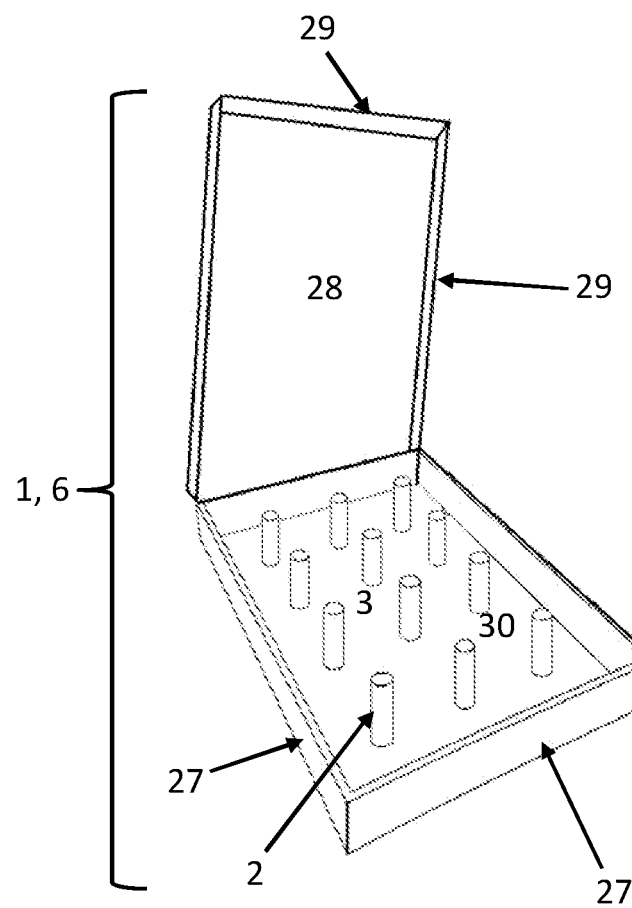
FIG. 4 is an image of the first embodiment of the apparatus indicating a riser, surface, a plurality of sides, and top.
Figure 5:
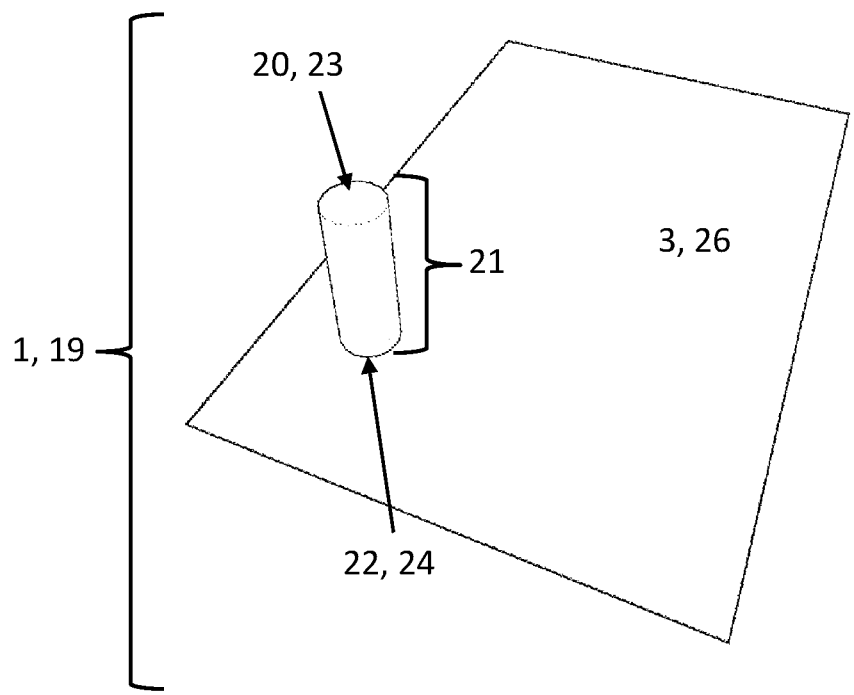
FIG. 5 is an image of the second embodiment of the apparatus indicating a riser and surface, wherein the surface is attractive to a magnet.
Figure 6:
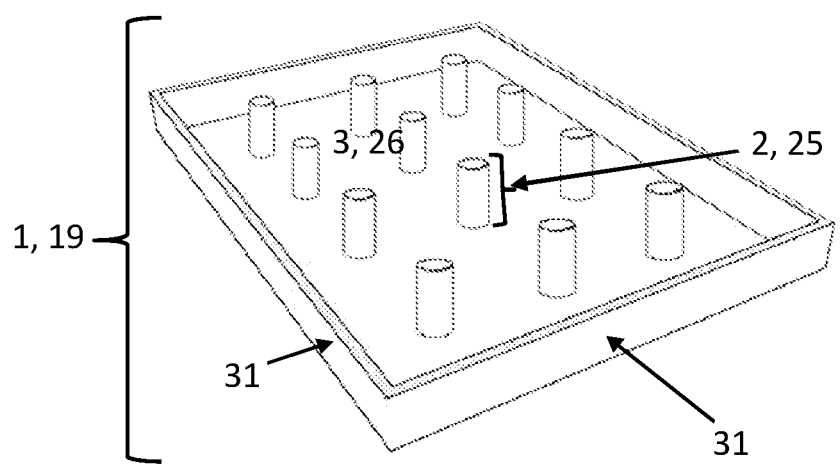
FIG. 6 is an image of the second embodiment of the apparatus indicating a riser, surface, and plurality of sides enclosing the apparatus.
Figure 7:
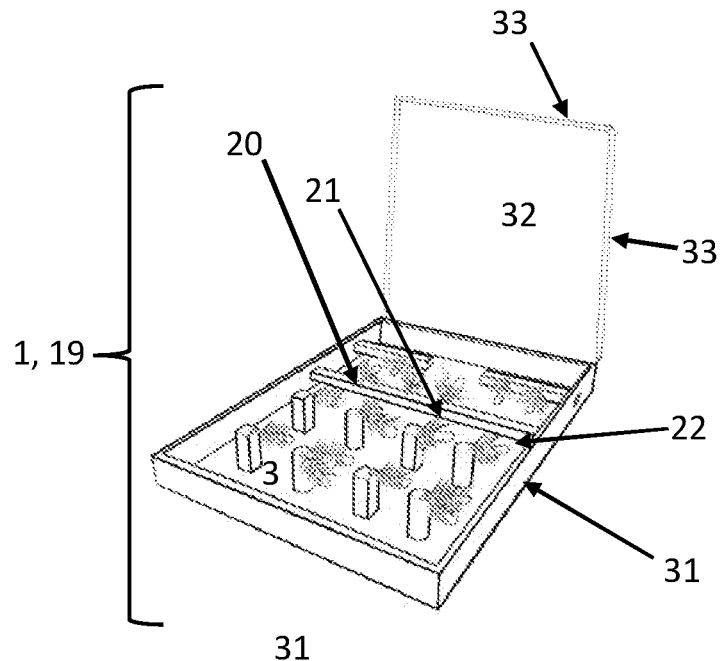
FIG. 7 is an image of the first embodiment of the apparatus indicating a riser, surface, a plurality of sides, and top.
Figure 8:
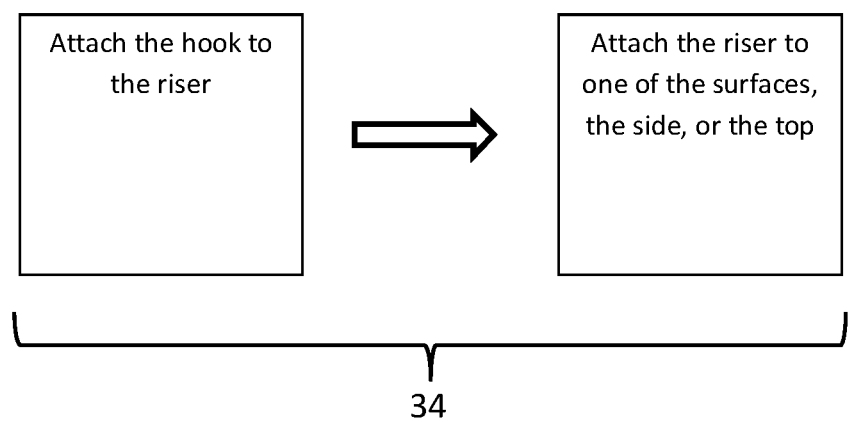
FIG. 8 is an image of the steps involved in the method of use of the first embodiment of the apparatus.
Figure 9:
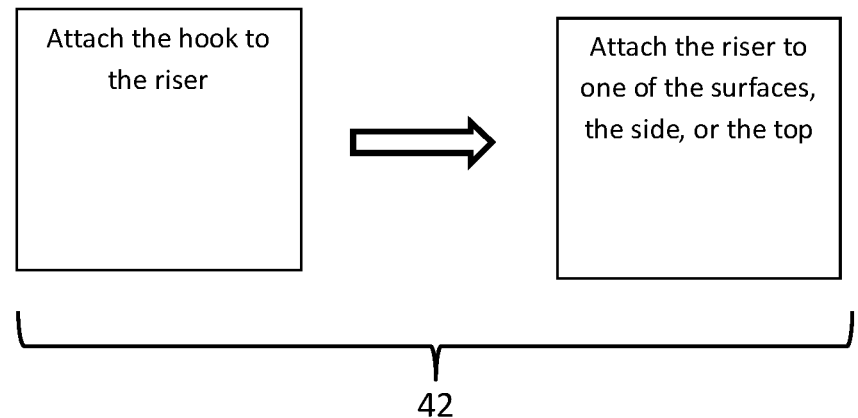
FIG. 9 is an image of the steps involved in the method of use of the second embodiment of the apparatus.
Figure 10:
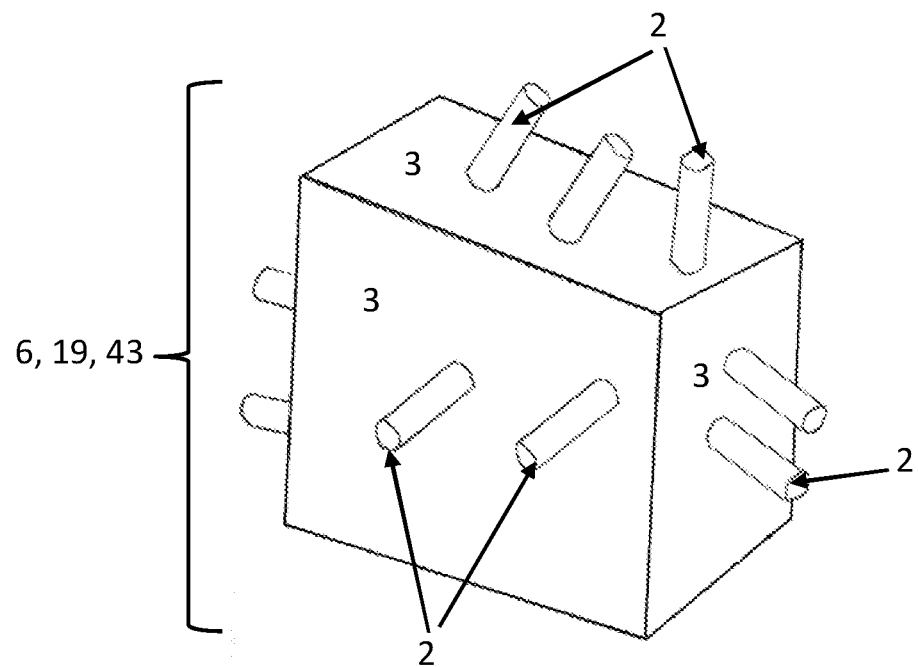
FIG. 10 is an image of a shape comprising an exterior wherein the exterior comprises a plurality of surfaces.

The present disclosure reveals an apparatus 1 for the protection of hackle during holding, securing, or storing comprising a riser 2 and a surface 3. The surface 3 comprises an upper surface 4 and a plurality of edges 5. The surface 3 may be, but is not limited to, a single plate, a badge that can be worn on clothing, a refrigerator or other surface to which the riser 2 can be attached. The riser 2 comprises a first end 7, a length 8, and a second end 9

In the first embodiment 6, the first end 7 of the riser 2 comprises a magnet 10. The second end 9 comprises at least one of a shape "A" 11 to fit into a hole 12 of a plurality of holes 12 (wherein a plurality of holes is defined as at least one hole), each hole 12 of the plurality of holes 12 being in the shape "A" 11 and being on the upper surface 4 of the surface 3; a threaded end 13 to fit into a perforation 14 of a plurality of perforations 14 (wherein said plurality of perforations is defined as at least one perforation) on the upper surface 4 of the surface 3; adhesive 15 to affix the riser 2 to the upper surface 4 of the surface 3; a socket 16 to affix the riser 2 to a stud 17 of a plurality of studs 17 (wherein said plurality of studs is defined as at least one stud) located on the upper surface 4 of the surface 3; or a shape 18 to affix the riser 2 to a clip 18 of a plurality of clips 18 (wherein said plurality of clips is defined as at least one clip) on the upper surface 4 of the surface 3, or the riser 2 may be an integral part of the surface 3.

In the second embodiment 19 of the apparatus 1, either the first end 7 has a magnet 23 and the second end 9 has a magnet 24 or the entire riser 2 is a magnet 25. The surface 3 comprises an upper surface 4, a plurality of edges 5, and wherein the surface 3 is attractive to magnets 26. In this embodiment 19, when either the first end 7 or the second end 9 of the riser 2 is placed against the surface 3 the magnetic force generated attaches the riser 2 to the surface 3 such that the length 21 of the riser 2 extends out from the surface 3.

The surface 3 may further comprise a plurality of sides 27, said plurality of sides 27 equal to the plurality of edges 5 of the surface 3 such that the plurality of sides 27 surrounds the surface 3 to create an enclosure. Moreover, the surface 3 may also comprise a top 28 where the top 28 comprises a plurality of boarders 29 equal to the plurality of sides 27 so that the plurality of boarders 29 fits over the plurality of sides 27 such that an enclosed space 30 is created into which hooks with hackle can be stored.

With regard to the first embodiment 6, the plurality of sides 27 and top 28 may further comprise plurality of holes 12 such that the second end of the riser can be inserted into any hole 12 of the plurality of holes 12 such that the length 8 of the riser 2 extends out from the hole 12. Any of the sides may, in the alternative, comprise a plurality of perforations 14 into which the threaded end 13 of the riser 2 may be affixed. Any of the sides may, in the alternative, comprise a plurality of studs 17 into which the socket 16 of the riser 2 may be affixed. Any of the sides may, in the alternative, comprise a plurality of clips 18 into which the second end 9 of the riser 2 may be affixed.

With regard to the second embodiment 19, the apparatus may further comprise a plurality of sides 31, said plurality of sides 31 equal to the plurality of edges 5 of the surface 3 such that the plurality of sides 31 surrounds the surface 3 to create an enclosure. These sides 31 may be attracted to a magnet to allow the riser 2 to be attached to and extend from the any of sides 31. The apparatus 1 may also further comprise a top 32. The top 32 would comprises a plurality of boarders 33 equal to the plurality of sides 31 so that the plurality of boarders 33 fits over the plurality of sides 31 such that an enclosed space is created into which hooks with hackle can be stored. Further, the top 32 may also be attractive to a magnet.

In any of the above-described embodiments 6, 19, there may also be a shape 40 comprising an exterior 41, wherein the exterior 41 comprises a plurality of surfaces 3, and wherein those surfaces 3 comprise the characteristics detailed in any of the above-described embodiments 6, 19.

The method 34 of using the apparatus 1 for the first embodiment 6 comprises the use of the apparatus 1 and a hook 35. The hook 35 is a fishing hook or other feature to which hackle 36 is attached. The hook 35 comprises an eye 37, a length 38, and a bend 39, and the hook 35 is attractive to a magnet. Extending out from the length 38 or bend 39 is hackle 36. The eye 37 of the hook 35 or the bend 39 attaches to the first end 7 of the riser 2, and the second end 9 of the riser 2 connected to at least one of the surface 3, one of the sides of the plurality of sides 27, or the top 28 by at least one of: inserting the second end 9 of the riser 2 into a hole 12 of the plurality of holes 12 onto at least one of the surface 3, one of the sides of the plurality of sides 27, or the top 28; inserting the treaded end 13 into a perforation 14 of the plurality of perforations 14 onto at least one of the surface 3, one of the sides of the plurality of sides 27, or the top 28 and twisting the riser 2 into place; attaching the second end 9 of the riser 2 onto at least one of the surface 3, one of the sides of the plurality of sides 27, or the top 28 with the use of an adhesive 15; pressing the socket 16 on the second end 9 of the riser 2 onto a stud 17, said stud 17 being attached onto at least one of the surface 3, one of the sides of the plurality of sides 27, or the top 28; or clipping the second end 9 of the riser 2 to the a clip 18 of the plurality of clips 18, said clip 18 being attached onto at least one of the surface 3, one of the sides of the plurality of sides 27, or the top 28.

A method 34 of using the apparatus 1 for the second embodiment 19 comprising the use of the apparatus 1 and a hook 35. The hook 35 is a fishing hook or other feature to which hackle 36 is attached. The hook 35 comprises an eye 37, a length 38, and a bend 39, and the hook 35 is attractive to a magnet. Extending out from the length 38 or bend 39 is hackle 36. The eye 37 of the hook 35 or the bend 39 attaches to the first end 7 of the riser 2. The second end 9 of the riser 2 can then be attached to at least one of the surface 3, one of the sides 27 of the plurality of sides 27, or the top 28 through the magnetic attraction between the riser 2 and the at least one of the surface 3, one of the sides 27 of the plurality of sides 27, or the top 28.

What is claimed:

1. An apparatus for the protection of hackle during holding, securing or storing consisting of:
   a surface and riser;
   wherein the surface has an upper surface and a plurality of edges;
   wherein the riser has a first end, a length, and a second end;
   the first end having a shape, "A" and being magnetized;
   the second end having at least one of a shape "B" said shape "B" to fit into a hole of a plurality of holes, each hole of the plurality of holes being in the shape "B" and being on the upper surface of the surface, a threaded end to fit into a perforation of a plurality of perforations on the upper surface of the surface, a shape and adhesive to affix the riser to the upper surface of the surface, a socket to affix the riser to a stud of a plurality of studs located on the upper surface of the surface, or a shape to affix the riser to a clip of a plurality of clips on the upper surface of the surface, or the riser may be an integral part of the surface; and
   wherein each riser of the plurality of risers, when attached to the surface such that the length of the riser extends out from the surface.

2. An apparatus for the protection of hackle during holding, securing or storing consisting of:
   a surface, a riser, and a plurality of sides;
   wherein the surface has an upper surface and a plurality of edges;
   wherein the plurality of sides is equal to the plurality of edges of the surface such that each side of the plurality of sides surrounds the surface to create an enclosure;
   wherein the riser has a first end, a length, and a second end;
   the first end having a shape, "A" and being magnetized;
   the second end having at least one of a shape "B" said shape "B" to fit into a hole of a plurality of holes on at least one of the surface or at least one of the sides of the plurality of sides,
   each hole of the plurality of holes being in the shape "B" and being on the upper surface of the surface, a threaded end to fit into a perforation of a plurality of perforations on the upper surface of the surface, a shape and adhesive to affix the riser to the upper surface of the surface, a socket to affix the riser to a stud of a plurality of studs located on the upper surface of the surface, or a shape to affix the riser to a clip of a plurality of clips on the upper surface of the surface, or the riser may be an integral part of the surface; and
   wherein each riser of the plurality of risers, when attached extends out from at least one of the surface, or at least one of the sides of the plurality of sides.

3. An apparatus for the protection of hackle during holding, securing or storing consisting of:
   a surface, a riser, a plurality of sides, and a top;
   wherein the surface has an upper surface and a plurality of edges;
   wherein the plurality of sides is equal to the plurality of edges of the surface such that each side of the plurality of sides surrounds the surface to create an enclosure;
   wherein said top has a plurality of boarders equal to the plurality of sides so that the plurality of boarders fits over the plurality of sides such that an enclosed space is created into which hooks with hackle can be held, secured, or, stored;
   wherein the riser has a first end, a length, and a second end;
   the first end having a shape, "A" and being magnetized;
   the second end having at least one of a shape "B" said shape "B" to fit into a hole of a plurality of holes on at least one of the surface or at least one of the sides of the plurality of sides,
   each hole of the plurality of holes being in the shape "B" and being on the upper surface of the surface, a threaded end to fit into a perforation of a plurality of perforations on the upper surface of the surface, a shape and adhesive to affix the riser to the upper surface of the surface, a socket to affix the riser to a stud of a plurality of studs located on the upper surface of the surface, or a shape to affix the riser to a clip of a plurality of clips on the upper surface of the surface, or the riser may be an integral part of the surface; and
   wherein each riser of the plurality of risers, when attached extends out from at least one of the surface, or at least one of the sides of the plurality of sides.

4. An apparatus for the protection of hackle during holding, securing or storing consisting of:
   a surface, a riser, and a plurality of sides, and an exterior;
   wherein the surface has an upper surface and a plurality of edges;
   wherein the plurality of sides is equal to the plurality of edges of the surface such that each side of the plurality of sides surrounds the surface to create an enclosure;
   wherein the riser has a first end, a length, and a second end;
   the first end having a shape, "A" and being magnetized;
   the second end having at least one of a shape "B" said shape "B" to fit into a hole of a plurality of holes on at least one of the surface, the exterior, or at least one of the sides of the plurality of sides,
   each hole of the plurality of holes being in the shape "B" and being on the upper surface of the surface, a threaded end to fit into a perforation of a plurality of perforations on the upper surface of the surface, a shape and adhesive to affix the riser to the upper surface of the surface, a socket to affix the riser to a stud of a plurality of studs located on the upper surface of the surface, or a shape to affix the riser to a clip of a plurality of clips on the upper surface of the surface, or the riser may be an integral part of the surface; and
   wherein each riser of the plurality of risers, when attached extends out from at least one of the surface, the exterior, or at least one of the sides of the plurality of sides.

5. An apparatus for the protection of hackle during holding, securing or storing consisting of:
   a surface, a riser, a plurality of sides, a top, and an exterior;
   wherein the surface has an upper surface and a plurality of edges;

wherein the plurality of sides is equal to the plurality of edges of the surface such that each side of the plurality of sides surrounds the surface to create an enclosure;

wherein said top has a plurality of boarders equal to the plurality of sides so that the plurality of boarders fits over the plurality of sides such that an enclosed space is created into which hooks with hackle can be held, secured, or, stored;

wherein the riser has a first end, a length, and a second end;

the first end having a shape, "A" and being magnetized;

the second end having at least one of a shape "B" said shape "B" to fit into a hole of a plurality of holes on at least one of the surface, the exterior, or at least one of the sides of the plurality of sides, each hole of the plurality of holes being in the shape "B" and being on the upper surface of the surface, a threaded end to fit into a perforation of a plurality of perforations on the upper surface of the surface, a shape and adhesive to affix the riser to the upper surface of the surface, a socket to affix the riser to a stud of a plurality of studs located on the upper surface of the surface, or a shape to affix the riser to a clip of a plurality of clips on the upper surface of the surface, or the riser may be an integral part of the surface; and wherein each riser of the plurality of risers, when attached extends out from at least one of the surface, the exterior, or at least one of the sides of the plurality of sides.

* * * * *